Oct. 28, 1958

G. LITHUN 2,857,933

CONDUIT PLUGGING DEVICE

Filed Feb. 8, 1957

INVENTOR.
GEORGE LITHUN
BY
McMorrow, Berman & Davidson
ATTORNEYS

United States Patent Office 2,857,933
Patented Oct. 28, 1958

2,857,933

CONDUIT PLUGGING DEVICE

George Lithun, Harvey, N. Dak.

Application February 8, 1957, Serial No. 638,982

3 Claims. (Cl. 138—93)

The present invention relates to a device for stopping the flow of the fluid through a conduit open end.

An object of the present invention is to provide a conduit plugging device which lends itself to easy and rapid insertion into the open end of a water line or other conduit for the purpose of temporarily stopping the flow of water therethrough while such line is being repaired or tested, and one which may be as easily and readily removed therefrom.

Another object of the present invention is to provide a conduit plugging device which is simple in structure, sturdy in construction and economical to manufacture and assemble, and one which is highly efficient in action.

Figure 1:
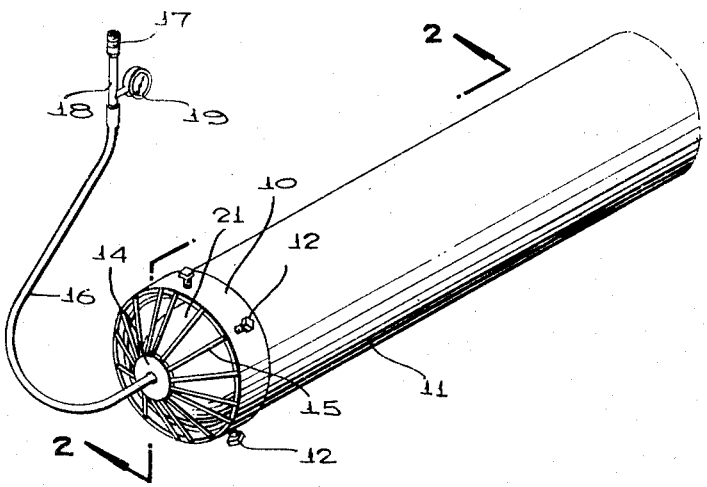
Figure 2:
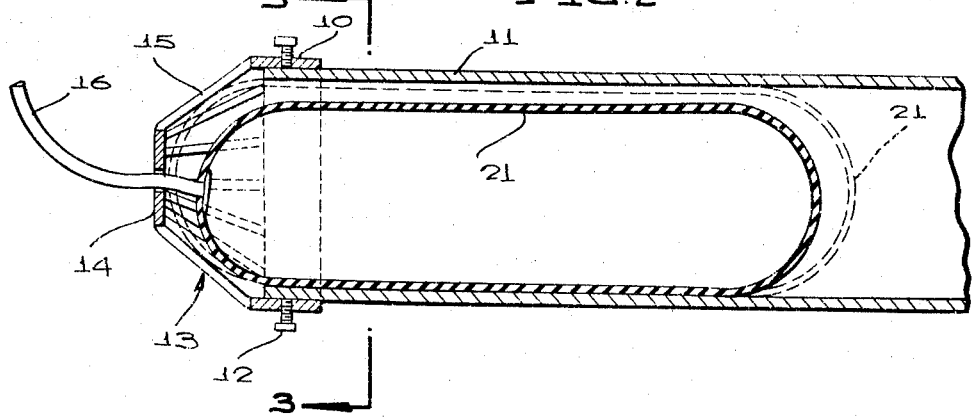
Figure 3:
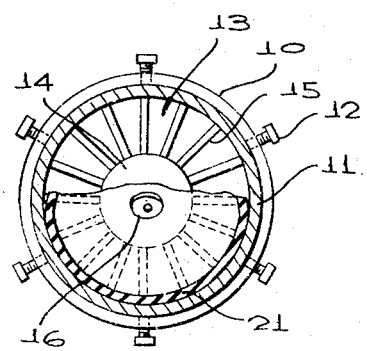

These and other objects and advantages of the present invention will become fully apparent from the following description when taken in connection with the annexed drawing, in which:

Figure 1 is a perspective view of the device of the present invention, shown inserted within one end of a conduit, Figure 2 is a sectional view, on an enlarged scale, taken on line 2—2 of Figure 1, and Figure 3 is a sectional view taken on line 3—3 of Figure 2.

Referring in greater detail to the drawing in which like numerals indicate like parts throughout the several views, the conduit plugging device, according to the present invention, comprises a ring 10 of a size as to slip loosely over the portion adjacent one end of a conduit 11.

Means is provided, carried by the ring 10, to detachably engage the portion of the conduit 11 when the ring 10 is circumposed about said conduit portion and, specifically, this means embodies a plurality of bolts 12 arranged in spaced relation about the ring 10, each bolt 12 being rotatably mounted in a threaded hole in the ring 10 for rotational movement in clockwise and counterclockwise directions.

A cage, indicated generally by the reference numeral 13, projects longitudinally from one end of the ring 10 and bridges the open end of the conduit 11 when the ring 10 is in its position circumposed about the end portion of the conduit 11. The cage 13 embodies an annular plate 14 arranged in parallel spaced relation with respect to and on one side of the ring 10, and a plurality of radially disposed rods 15 extending about the plate 14 and each having one end connected to the periphery of the plate 14 and the other end connected to an adjacent portion of the ring 10. A flexible tube 16 extends slidably through the center of the plate 14 with one end within the cage 13, and the other end provided with a nipple 17 for attachment to a source of fluid under pressure, the nipple 17 being exteriorly of the cage 13. The nipple 17 may contain a valve for preventing the flow of fluid out of the tube 16 and a T 18 connects the adjacent end of the tube 16 to the nipple 17 and supports thereon a fluid pressure indicator 19.

An inflatable flexible bag 21, fabricated of rubber or the like, is positioned, so that a portion adjacent one end thereof is within the cage 13 and has an opening thereinto connected in communication with the tube 16 on the end thereof which is within the cage 13. The bag 21 is of a size and partially inflated, so as to be readily insertable and slidable within the conduit 11 and when inflated, having its remaining portion expandable to an extent such as to bridge the opening in the conduit 11 and to thereby temporarily close the conduit one end.

In use, the conduit plugging device, according to the present invention, is positioned so that the ring 10 is circumposed about the conduit 11 adjacent one end of the latter with the bag 21 in uninflated condition and slipped into the conduit 11 to where it will assume the poistion shown in full lines in Figure 2. Upon the admission to the bag 21 of fluid under pressure through the tube 16 the bag 21 will expand to the dotted line position shown in Figure 2, completely bridging the opening in the conduit 11 and stopping the flow of fluid therethrough. The cage 13 permits the flow of water or other fluid around the uninflated bag 21 and securely holds the bag 21 within the end portion of the conduit 11 while the bag 21 is being inflated. The fluid pressure indicator 19 may be used to ascertain when the fluid pressure within the bag 21 has reached a predetermined and desired pressure.

It will be seen, therefore, that the conduit plugging device, according to the present invention, may be used by easily and rapidly inserting the bag 21 within the conduit open end and admitting fluid or liquid under pressure through the tube 16 into the interior of the bag 21 to effectively close-off the flow of water or other fluid therethrough.

What is claimed is:

1. For use in temporarily closing one end of a conduit, a plugging device comprising a ring adapted to be circumposed about the portion adjacent said one end of said conduit, means carried by said ring and adapted to detachably engage said conduit portion when said ring is circumposed about said conduit portion, a cage projecting longitudinally from said ring and adapted to bridge said conduit one end when said ring is circumposed about said conduit portion, a tube extending slidably through said cage and having one end within said cage and having the other end exteriorly of said cage and adapted to be connected to a source of fluid under pressure, and an inflatable bag positioned so that the portion adjacent one end thereof is within said cage and connected in communication with said one end of said tube, said bag being of a size such that the remaining portion thereof is adapted to be freely inserted into said conduit through said one end thereof and being inflatable, upon admission of fluid under pressure therein through said tube, to an extent as to bridge the opening in said conduit and engage the inner wall of said conduit to temporarily close said conduit one end.

2. For use in temporarily closing one end of a conduit, a plugging device comprising a ring adapted to be circumposed about the portion adjacent said one end of said conduit, means carried by said ring and adapted to detachably engage said conduit portion when said ring is circumposed about said conduit portion, said means embodying a plurality of bolts arranged in spaced relation about said ring and each supported in said ring for rotational movement in clockwise and counterclockwise directions, a cage projecting longitudinally from said ring and adapted to bridge said conduit one end when said ring is circumposed about said conduit portion, a tube extending through said cage and having one end within said cage and having the other end exteriorly of said cage and adapted to be connected to a source of fluid under pressure, and an inflatable bag positioned so that a portion adjacent one end thereof is within said cage and connected in communication with said one end of said tube, said bag being of a size such that the remaining portion thereof is adapted to be freely inserted into said conduit through said one end thereof and being inflatable, upon admission of fluid under pressure therein through said tube, to an extent as to bridge the opening in said conduit and engage the inner wall of said conduit to temporarily close said conduit one end.

3. For use in temporarily closing one end of a conduit, a plugging device comprising a ring adapted to be circumposed about the portion adjacent said one end of said conduit, means carried by said ring and adapted to detachably engage said conduit portion when said ring is circumposed about said conduit portion, a cage embodying an annular plate arranged in parallel spaced relation with respect to and on one side of said ring and a plurality of radially disposed rods extending about said plate and each having one end connected to the periphery of said plate and having the other end connected to the adjacent portion of said ring, said cage being adapted to bridge said conduit one end when said ring is circumposed about said conduit portion, a tube extending slidably through said plate and having one end within said cage and having the other end exteriorly of said cage and adapted to be connected to a source of fluid under pressure, and an inflatable bag positioned so that the portion adjacent one end thereof is within said cage and connected in communication with said one end of said tube, said bag being of a size such that the remaining portion thereof is adapted to be freely inserted into said conduit through said one end thereof and being inflatable, upon admission of fluid under pressure therein through said tube, to an extent as to bridge the opening in said conduit and engage the inner wall of said conduit to temporarily close said conduit one end.

References Cited in the file of this patent

UNITED STATES PATENTS

| | | |
|---|---|---|
| 986,297 | Kinkade | Mar. 7, 1911 |
| 1,906,151 | Goodman | Apr. 25, 1933 |
| 2,749,945 | Kaiser | June 12, 1956 |